March 28, 1967 J. W. GRAHAM ETAL 3,311,433
ROTARY THRUST BEARING
Filed April 20, 1965
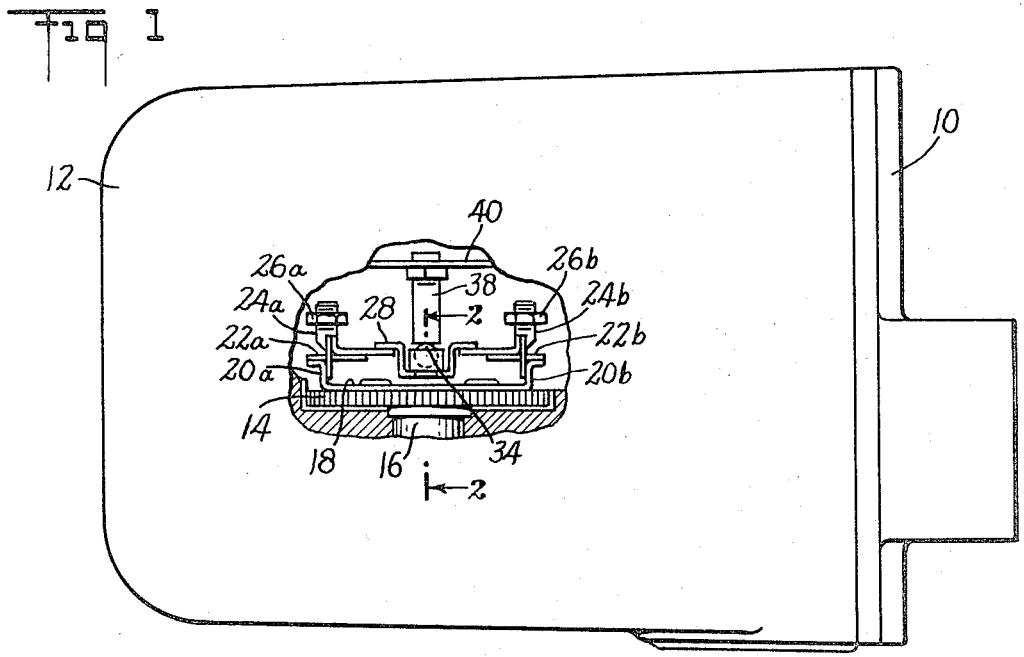
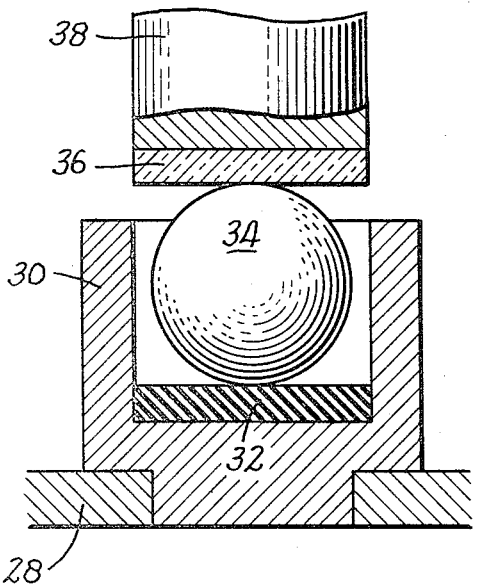
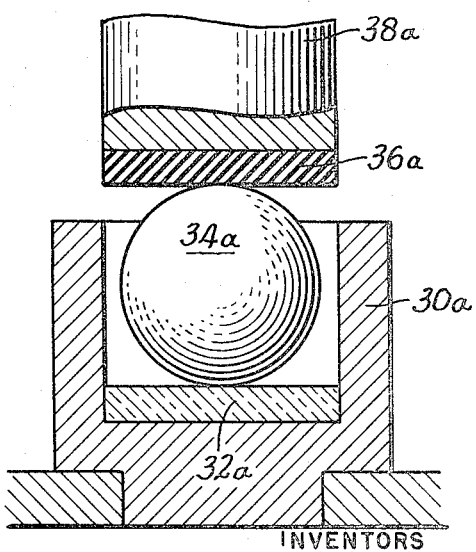
INVENTORS
James W. Graham
George E. Sgourakes
BY
Curtis, Morris + Safford
ATTORNEYS 3,311,433
ROTARY THRUST BEARING
James W. Graham, Foxboro, and George E. Sgourakes, Millis, Mass., assignors to The Foxboro Company, Foxboro, Mass.
Filed Apr. 20, 1965, Ser. No. 449,506
9 Claims. (Cl. 308—230)

This invention relates to rotary thrust bearings. More particularly, this invention relates to such bearings wherein the thrust load is carried by a ball engaged with a substantially flat bearing surface.

There are many devices in which bearings are needed for transmitting a force between two relatively rotating members. Frequently such bearings tend to wear more rapidly than is desired, such as when the device must operate continuously or at high rotational speeds, or both.

One example of a device which rotates continuously at high speed is the flow integrating instrument disclosed in U.S. Patent 2,930,231 to Bowditch. That instrument comprises a turbine rotating an offset weight which develops a corresponding centrifugal force for transmittal to an essentially stationary balanceable force bar. The force is transmitted in that instrument by a long thin rod mounted at its ends in conventional bearings, e.g., of the type known as "end stone-ring stone" bearings. The rod was made relatively long in order to reduce angular errors due to dimensional discrepancies in the relative positioning of the end bearings. Even when so constructed, however, such an arrangement tends to wear more rapidly than desired, and thus has presented a problem in the design of such instruments.

The present invention is described herein as applied to an instrument of the type disclosed in the above-identified Bowditch patent. However, it should be understood that this invention is not limited to such use, and may be adapted for incorporation in a variety of devices.

Accordingly, it is a general object of this invention to provide improved rotary thrust bearings. A more specific object of this invention is to provide a ball-type rotary bearing so arranged that the ball automatically aligns itself with the axis of rotation during operation, thereby assuring relatively low rates of wear. Other objects, aspects and advantages of the invention will be pointed out in, or apparent from, the following description considered together with the accompanying drawing in which:

FIGURE 1 is an elevation view of a flow integrating instrument, shown partly broken away to illustrate the thrust bearing arrangement carried by the rotatable turbine;

FIGURE 2 is an enlarged section of the bearing construction; and

FIGURE 3 is an enlarged section of a modified form of the invention.

Referring now to FIGURE 1, there is shown an instrument having a base 10 to which is secured a sleeve-like cover 12 surrounding the operating mechanism. This mechanism includes a rotatably-driven air turbine 14 mounted on a vertical shaft 16 supported for rotary movement about its axis by conventional bearings (not shown). To the top of the turbine wheel is secured a support plate 18 having upturned outer ends 20a, 20b.

Fastened to the upturned ends 20a, 20b are corresponding cross-flexures 22a, 22b pivotally mounting respective L-shaped lever arms 24a, 24b. Each lever arm includes an upstanding part serving as a weight to develop a centrifugal force about the axis defined by the intersection of the two flexible strips of the corresponding cross-flexure. The moment arm of each weight is made adjustable by means of a threaded nut 26a, 26b. The inwardly extending portions of arms 24a, 24b are fastened to a generally U-shaped support element 28 the vertical arms of which are flexible to accommodate slight rocking movements of arms 24a, 24b about the respective cross-flexures.

Referring now also to FIGURE 2, support element 28 carries a centrally positioned cylindrical cup 30 having a circular cross-section. In the bottom of this cup is a circular disc member 32 formed of ordinary rubber having at least a moderate amount of resilience. Member 32 is fitted in cup 30 with a light interference fit, and rotates with the cup when turbine 14 is spinning.

Engaged with the upper flat surface of rubber disc member 32 is a hard steel ball 34, essentially perfectly spherical and having a smooth outer surface free from irregularities. In an actual instrument of the type described herein, this ball had a diameter of one-quarter inch. Engaged with the top of this ball is the flat surface of a sapphire bearing member 36, parallel with the upper flat surface of rubber disc 32. Bearing member 36 is secured to the lower end of a rod 38 which is rigidly attached (see FIGURE 1) to the central region of a balanceable force bar 40. This bar is pivoted about a horizontal axis at its left-hand end (not shown herein).

In operation, the turbine wheel 14 is rotated by a stream of air under pressure, and the resulting centrifugal force on weights 24a, 24b produces an upwardly-directed force against the cup 30. This force is transmitted by ball 34 and rod 38 to the force bar 40, and the latter (by nozzle-flapper means described in the above-mentioned Bowditch patent) controls the flow of air to the turbine such that the rotational velocity thereof is directly proportional to the flow rate of the fluid being measured. The turbine rotates at speeds up to about 3,000 r.p.m., and develops a force in rod 38 within the range of about 0.1 to 1.0 pound.

It has been found that, when the instrument is operating, the ball 34 automatically centers itself over the axis of rotation of the turbine 14, providing the initial position of the ball is not too far away from that axis. In the instrument described herein, this automatic self-alignment occurs with initial radial offset distances of at least 0.01 inch, although it is not believed that this specific offset distance represents a critical limit. The cup 30 is provided primarily to assure that the initial position of the ball (i.e., at start-up of the instrument) is within the radial offset range providing automatic self-centering of the ball. In operation, the cup does not touch nor in any way restrain or alter the movements of the ball; of course, its presence assures operating personnel that the ball will not fly out and cause injury.

No rigorously satisfactory explanation has yet been developed to explain the self-centering action of the ball 34. It seems evident, however, that an inwardly-directed radial force is applied to the ball as a result of a differential action caused by the dissimilar character of the opposed flat contact surfaces of members 32 and 36 in engagement with the ball.

It is possible that the self-centering action results from the difference in resilience between the two surfaces 32 and 36. In this regard, it has been noted that when the ball is offset from the axial center of member 32 and is revolved thereby, the ball apparently also rolls while it moves around the orbit of revolution and thus tends to compress the rubber in a ring-shaped swath. The compressed resilient material of this swath beyond the center of the ball (i.e., beyond the vertical projection of this center on the member 32) produces a reaction force having a component directed radially inwardly, while the remainder of the compressed material produces a reaction force having an outwardly directed radial component. Since the swath is ring-shaped, its area beyond the circle defined by the movement of the vertical projection of the center of the ball (as the ball revolves in its initial orbit) is greater than the area interiorly of that circle. Thus it may be that the greater energy of compression of the outer area develops a greater inwardly directed radial component of force, tending to move the ball in towards the axis of revolution.

Experience also has shown that materials other than rubber can be utilized for the bearing member 32. For example, a resilient cork disc also will provide self-centering action.

There is some indication that the differential action of the two members 32 and 36 comprises an effect dependent upon the different coefficients of friction of the two members. Some slippage of the ball where it engages the sapphire surface of member 36 seems evident from preliminary observation. However, once the ball has reached the center of revolution, apparently it rotates with the resilient rubber member 32, so that at that time the active bearing engagement is between the ball and the sapphire member 36. With no relative movement between the ball and lower member 32, there will be no significant wear of the latter during operation. The sapphire member 36 also will not wear significantly because it is capable of supporting for extended periods of time the engagement of a ball which rotates in one position without orbital motion or other irregularities of movement.

FIGURE 3 shows a modified self-centering bearing construction. Here the upper bearing member 36a is moderately resilient rubber mounted on a stationary rod 38a, and the lower bearing member 32a is a sapphire element mounted in a rotating cup 30a. The ball 34a is the same as in the FIGURE 2 embodiment.

When the ball 34a is placed in a position offset from the rotational axis of cup 30a and the cup is rotated at a reasonably high speed, the ball moves radially inwards to the center of rotation. As before, this inward movement occurs only if the ball is positioned initially within a certain distance of the center; otherwise, the ball will tend to drift out radially as the cup rotates. There is some indication from experiments that to obtain self-centering in this embodiment the ball must be placed initially somewhat closer to the center than in the FIGURE 2 arrangement.

In any event, the bearings of both FIGURES 2 and 3 exhibit a self-centering effect providing for automatic alignment of the respective parts with the axis of rotation. Evidently the differential action of the two dissimilar bearing surfaces, providing different characteristics of engagement with the ball, creates an inwardly directed radial force. When this force is greater than the centrifugal force on the ball (the latter being proportional to the radius of revolution of the ball), the ball moves in to the center of rotation, where it remains while the instrument continues in operation.

This self-centering action is particularly advantageous because it establishes a bearing alignment providing very low rates of wear. Moreover, this alignment is effected automatically, and thus minimizes the need to work to very close dimensional tolerances during manufacture or calibration of the instrument.

Although several preferred embodiments of the invention have been disclosed in detail, it is desired to emphasize that this disclosure is for the purpose of illustrating and teaching the invention so that its principles can be understood and utilized in various forms to meet specific applications, it being understood that the invention is not limited by this disclosure except as required by the prior art.

We claim:
1. A self-centering rotary thrust bearing comprising a first bearing contact member having a flat surface, a second bearing contact member having a flat surface opposing the flat surface of said first member and parallel thereto, one of said two members being mounted for rotational movement relative to the other member about an axis transverse to said flat surfaces; a ball between said two surfaces and engaged therewith to support a thrust load along said rotational axis; said two surfaces being formed of materials having dissimilar characteristics of engagement with said ball developing a differential action producing a force thereon towards said axis when said ball is within a certain distance from said axis and is revolved about said axis by rotation of said one member relative to the other member.

2. A self-centering rotary thrust bearing comprising a first bearing contact member having a flat surface, a second bearing contact member having a flat surface opposing the flat surface of said first member and parallel thereto, one of said two members being mounted for rotational movement relative to the other member about an axis transverse to said flat surfaces; a ball between said two surfaces and engaged therewith to support a thrust load along said rotational axis; said two surfaces being formed of materials having different degrees of resiliency and applying to said ball a force directed towards said axis when said ball is within a certain distance from said axis and said one member is rotated relative to the other member.

3. A bearing as claimed in claim 2, wherein the material of one of said surfaces is resilient and the material of the other is non-resilient.

4. A bearing as claimed in claim 3, wherein said resilient material is rubber.

5. A bearing as claimed in claim 2, wherein the member having the surface of greater resiliency is mounted for rotation, the other member being stationary.

6. A bearing as claimed in claim 2, wherein the surface having the greater resiliency also has a greater coefficient of friction than the other surface.

7. A self-centering rotary thrust bearing comprising a first bearing contact member having a flat surface, a second bearing contact member having a flat surface opposing the flat surface of said first member and parallel thereto, one of said two members being mounted for rotational movement relative to the other member about an axis transverse to said flat surfaces; a ball between said two surfaces and engaged therewith to support a thrust load along said rotational axis; said two surfaces being formed of materials having different coefficients of friction and operative to apply to said ball a force directed towards said axis when said ball is within a certain distance from said axis and said one member is rotated relative to the other member.

8. A bearing as claimed in claim 7, wherein one of said surfaces is formed of moderately resilient material having a higher coefficient of friction than the other surface.

9. A bearing as claimed in claim 7, wherein said ball is formed of hard material having a smooth outer surface.

References Cited by the Examiner
UNITED STATES PATENTS

| | | | |
|---|---|---|---|
| 405,559 | 6/1889 | Johansson | 208—230 |
| 679,078 | 7/1901 | Kimball | 208—230 |

MARTIN P. SCHWADRON, *Primary Examiner.*
FRANK SUSKO, *Examiner.*